INVENTORS
HARDEN D. VOLLMER
AND WILLIAM L. PAULISON JR.
BY
Raymond W. Junkins
ATTORNEY April 30, 1957  H. D. VOLLMER ET AL  2,790,429
CONTROL SYSTEMS
Filed Nov. 6, 1951  5 Sheets-Sheet 3

INVENTORS
HARDEN D. VOLLMER
AND WILLIAM L. PAULISON JR.
BY
Raymond W. Junkins
ATTORNEY April 30, 1957 H. D. VOLLMER ET AL 2,790,429
CONTROL SYSTEMS
Filed Nov. 6, 1951 5 Sheets-Sheet 4
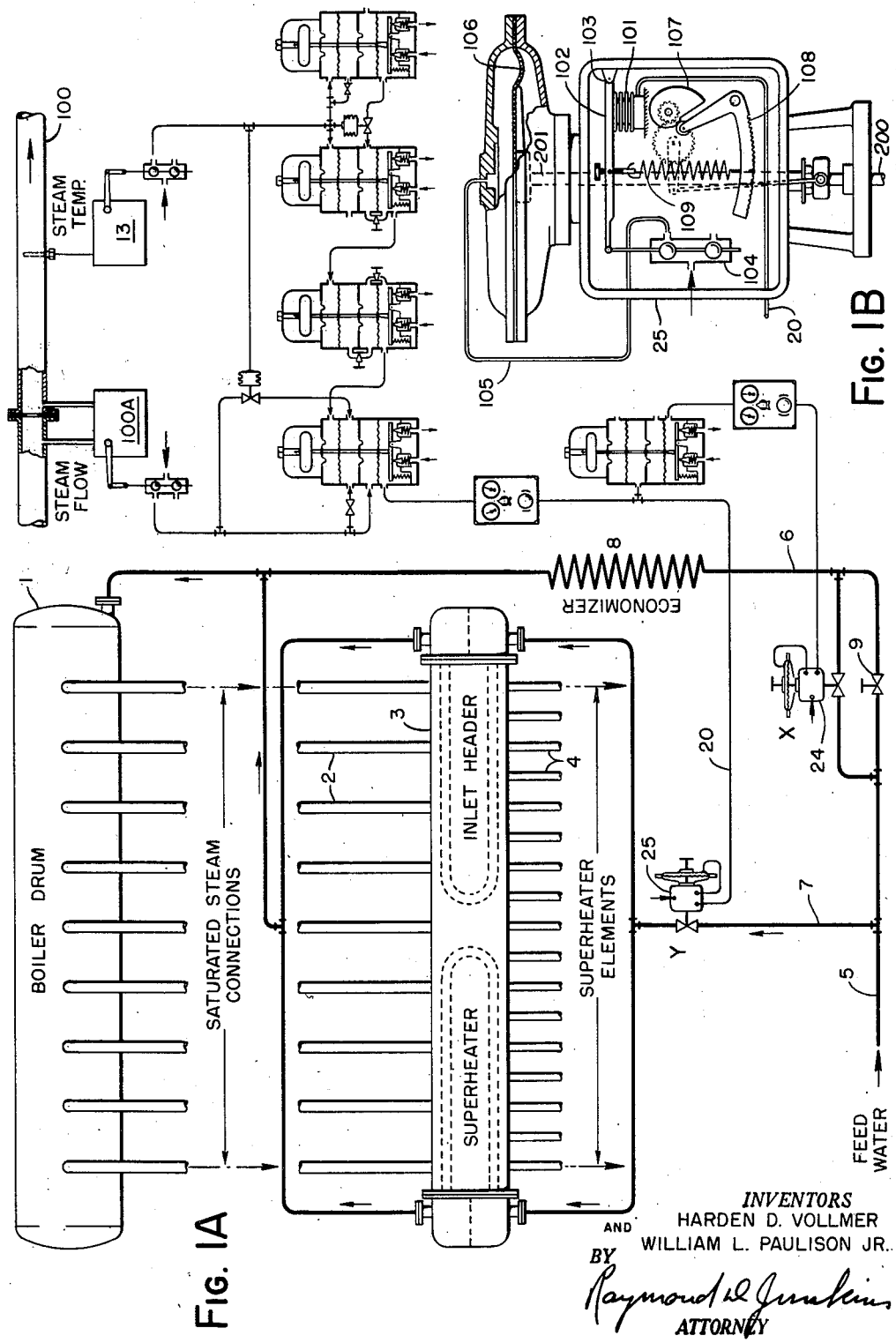
INVENTORS
HARDEN D. VOLLMER
AND WILLIAM L. PAULISON JR.
BY
Raymond W. Junkins
ATTORNEY

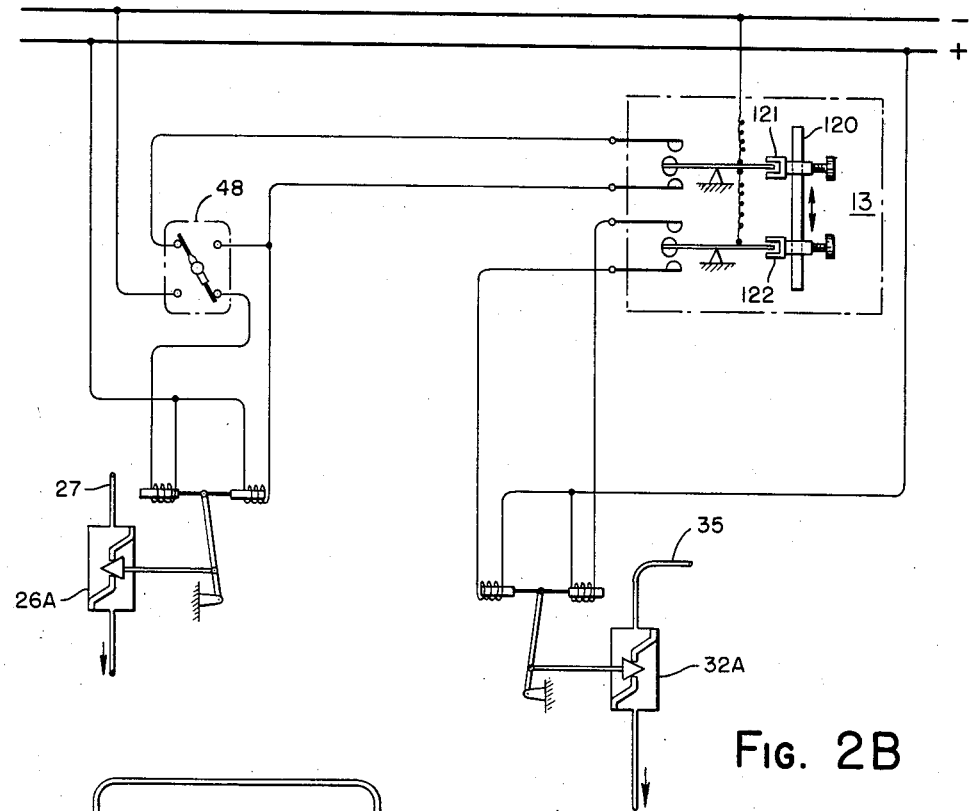
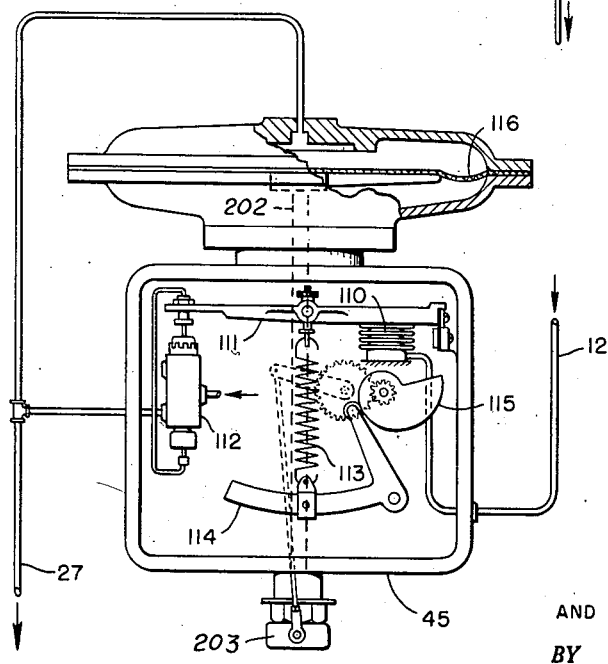

United States Patent Office 2,790,429
Patented Apr. 30, 1957

2,790,429

CONTROL SYSTEMS

Harden D. Vollmer, Richmond, Va., and William L. Paulison, Jr., Ridgewood, N. J., assignors to Bailey Meter Company, a corporation of Delaware Application November 6, 1951, Serial No. 255,038

24 Claims. (Cl. 122—479)

Our invention relates broadly to the control of heat exchange apparatus for regulating the final temperature of vapors or gases.

More specifically, the invention relates to the control of an indirect heat exchanger located in the path of the flow of steam generated by a vapor generator for maintaining the superheated steam leaving the unit within desired temperature limits. It will be evident that our invention may be adapted to other arrangements of power producing or utilizing apparatus and that we have merely chosen, by way of example, to illustrate and describe certain preferred embodiments.

A preferred form of our invention is herein exemplified by a control of the rate of supply of water to a condenser type indirect heat exchanger or attemperator constituting the inlet header of a superheater which is supplied with steam from the separation drum of a vapor generator. Another embodiment discloses a control of the supply of cooling water to an indirect heat exchanger located between a primary and a secondary superheater in the flow path of steam from a separation drum of the vapor generator. In either embodiment the heat exchanger serves the purpose of regulating the final temperature of the steam leaving the unit to maintain it within desired limits.

A principal object of the invention lies in the control of the rate of water supplied to the heat exchanger, in accordance with one or more selected variables in the operation of the unit, to the end that the final temperature of the steam will be maintained within certain limits.

Another object is to control a heat exchanger in such a manner that the steam produced by the unit will be within the desired limits of total temperature at different rates of output within the controllable range of unit operation.

A further object is to particularly adapt a control system for start-up and stand-by operation of what may be normally considered as a continuous operation.

A further object is to control the heat exchanger responsive to an indication of demand as well as responsive to an indication of one or more variable conditions of the steam.

Another object is to provide method and apparatus for controlling the supply of water to a heat exchanger, responsive to rate of unit operation as well as to correct for tendencies of the produced steam to depart from desired final temperature.

Further objects will be evident from a study of the drawings and of the description thereof, the examples being preferred embodiments of our invention.

In the drawings:

Fig. 1A is the same as Fig. 1 except to include a different index of demand.

Fig. 1B is an enlarged view of a valve positioner.

Figure 2:
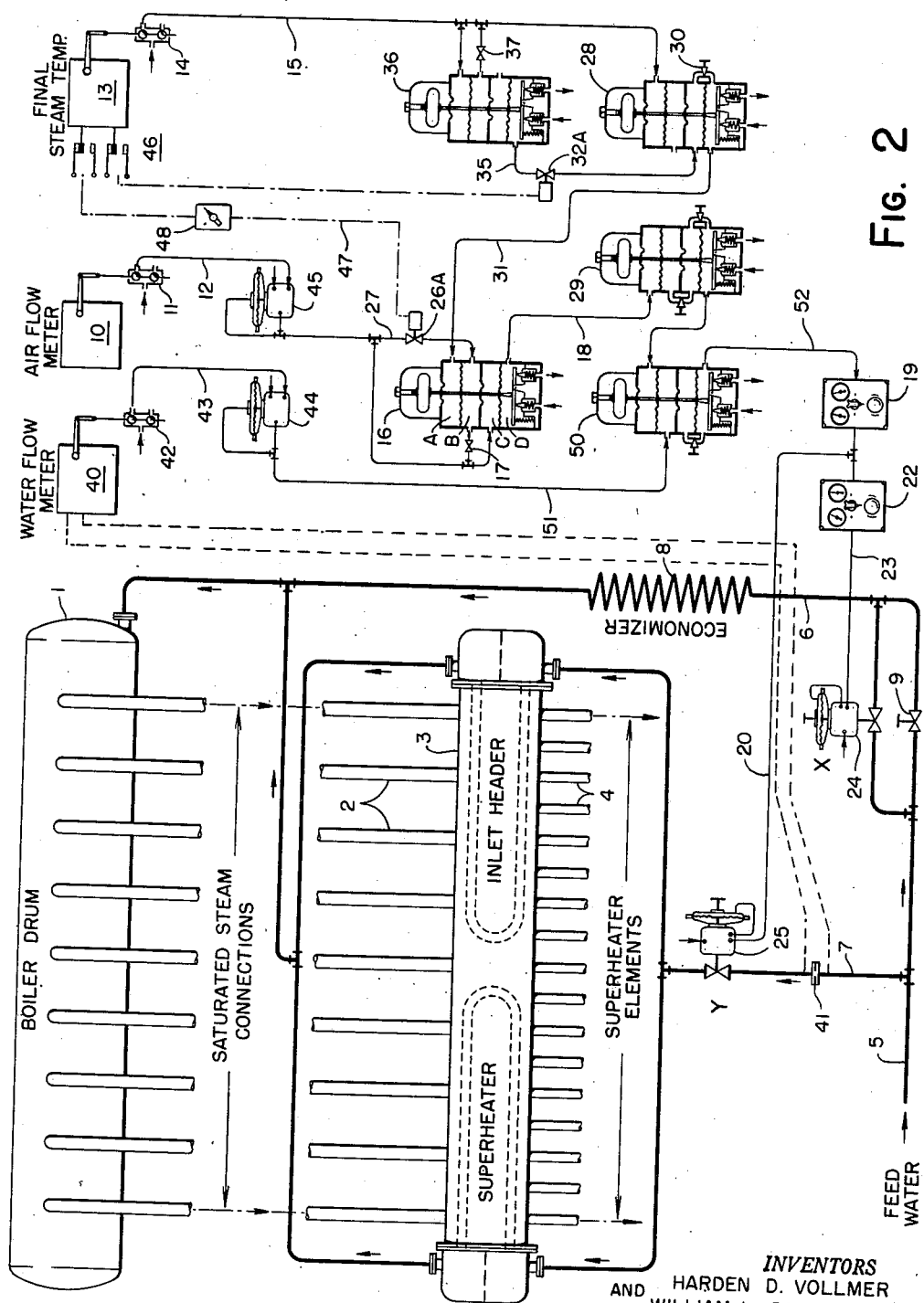

Fig. 2 diagrammatically illustrates a slightly different embodiment of our invention in connection with the same general type of unit but including a tie-back from a measured rate of supply of water to the heat exchanger.

Figure 3:
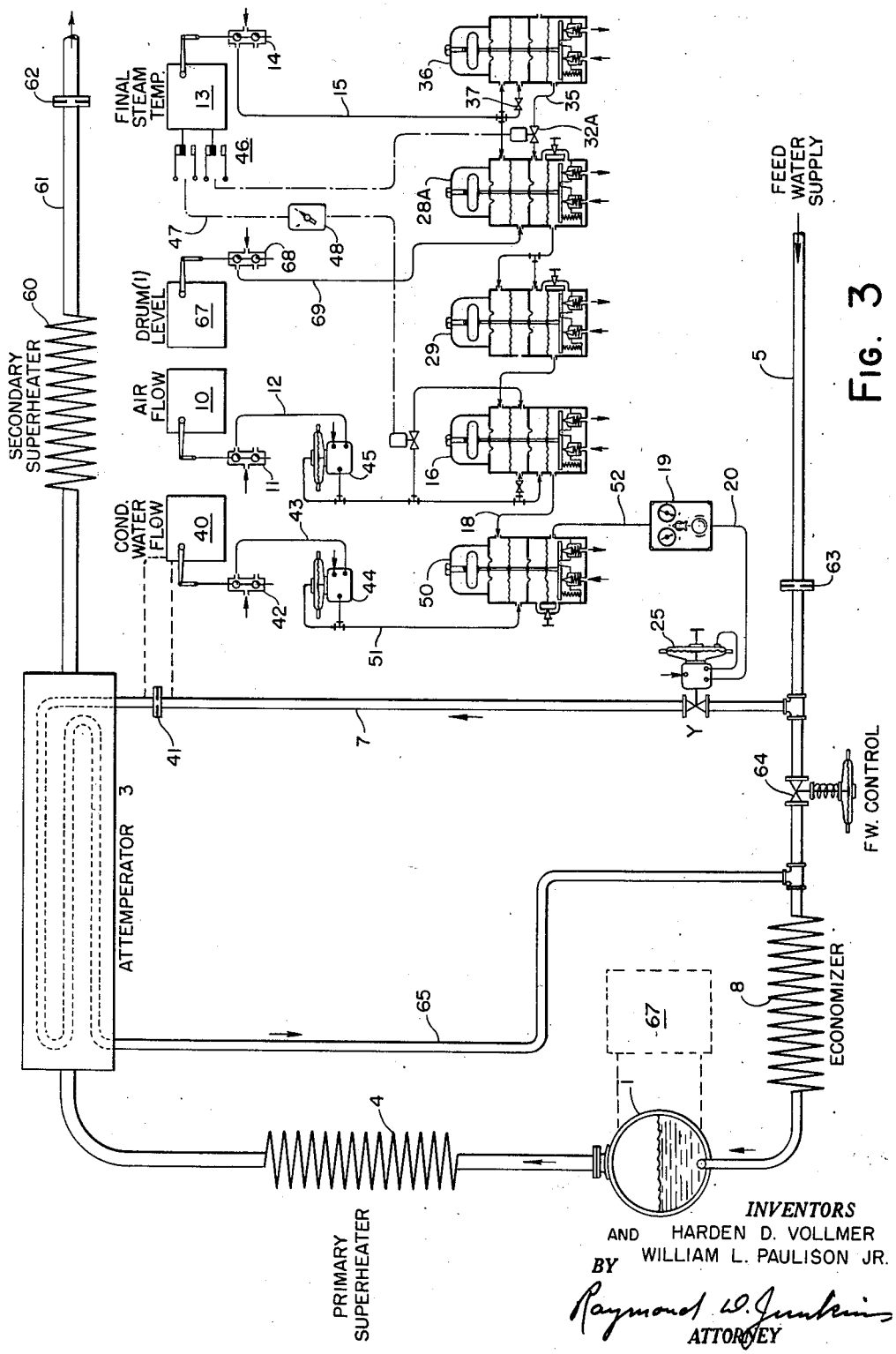

Fig. 2A is an enlarged view of a characterizer of Figs. 2 and 3.

Fig. 2B is an electric circuit diagram in connection with Figs. 2 and 3.

Fig. 3 diagrammatically illustrates an embodiment of our invention as a control system for a heat exchanger in connection with a vapor generator having both a primary and a secondary superheater, one of which may be a radiant type and the other a convection type.

Figure 1:
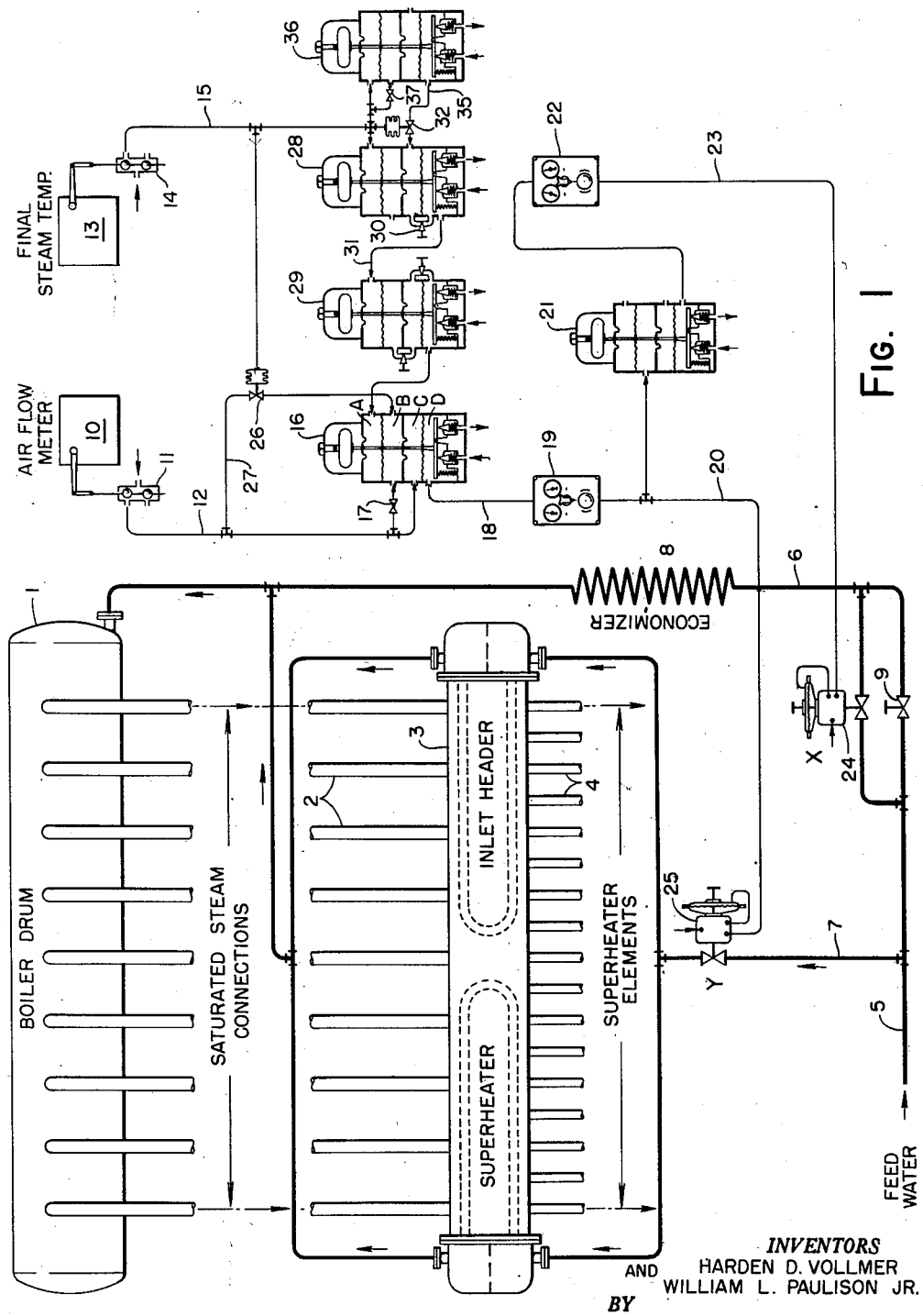
Fig. 1 is a diagrammatic view of our control system for a heat exchanger in a system for producing controlled temperature superheated steam with a unit having a convection type superheater.

Referring now particularly to Fig. 1, we illustrate therein in somewhat diagrammatic fashion the control of cooling water supplied to a heat exchanger or attemperator located in the flow path between the boiler separation drum and a single superheater which may, for the sake of example, be a convection type having a characteristic of generally increasing function with load. We do not believe that it is necessary to complicate the drawing by illustrating the furnace and other portions of the vapor generator which do not concern themselves primarily with our invention but serve in well known manner to supply heated water and steam to separation drum 1.

The drum 1 is connected by a plurality of saturated steam connections 2 with a superheater inlet header 3 which takes the form of a condenser type heat exchanger or attemperator. Leaving the header 3 are numerous superheater elements 4 which may later be joined in known manner by a header or headers from which the main unit discharge steam connection 100 (Fig. 1A) is taken. As diagrammatically indicated in Fig. 1 we are concerned, in the present invention, with a control of heated feed water supplied to the drum 1 by way of an economizer and the heat exchanger 3, and thus the drawing illustrates merely those portions of the vapor generating unit, supplemented by a control system comprising our invention.

It is contemplated that the unit of Fig. 1 is of a type having a single superheater (the elements 4) and the location of such superheater relative to the furnace or to the flow path of the hot gases of combustion is immaterial in the present invention but is chosen in known manner so that the necessary quantity and value of heated gases is applied to the superheater whereby, in connection with the controlled heat exchanger 3, the ultimate temperature of the superheated steam leaving the unit is within the desired limits. When we speak hereafter of the final steam temperature we are, of course, referring to the total temperature of the steam leaving the superheater and thus leaving the vapor generating unit to a point of usage or demand.

It is apparent that as demand upon the unit varies, changes may be required in the operation of the heat exchanger 3, due to varying quantity rate of steam passing from the drum 1 and possibly a varying condition of the steam such, for example, as the temperature thereof and/or the amount of moisture carried along with the steam. Thus we provide a primary or coarse control of the attemperator in accordance with the dictates of demand upon the unit, but we utilize the final temperature of the superheated steam leaving the superheater elements 4 as a checkback or vernier readjustment of the primary control and take into account corrections for valve characteristics and the like. The control system of our invention is in general adapted to proportion the amount of feed water going to the unit along two paths, one of which leads directly to the separation drum 1 and the other leads to the drum by way of the heat exchanger 3. It is in the control of such distribution of the feed water supply that we are primarily concerned.

Feed water is supplied to the unit through a conduit 5 branching to conduits 6 and 7. In the conduit 6 is a regulating valve X and an economizer 8. Located in the conduit branch 7 is a regulating valve Y after which the conduit branches to opposite ends of the heat exchanger 3, passing therefrom to join the conduit 6 on its way to the drum 1. The control of the total rate of supply of feed water to the unit through the conduit 5 does not form a part of our present invention and is not therefore illustrated in Fig. 1. We are concerned primarily with the distribution of the water being fed through the conduit 5, as to whether it is passed directly to the drum 1 or whether a portion of the water first goes through the heat exchanger 3.

The valve X is by-passed (in the conduit 6) by an adjustable valve 9 which will allow at all times sufficient passage of water through the economizer to prevent steaming thereof.

Operation of the valves X, Y regulates the operation of the heat exchanger 3 in such a manner as to produce steam leaving the unit within the desired temperature limits. Positioning of the valves is accomplished automatically through the agency of a control system dominated by a measure of demand upon the unit and by final temperature of the steam leaving the unit.

As an indication of demand or load upon the unit we show an air flow meter 10 arranged to vertically position the movable element of a pneumatic pilot valve 11, thereby establishing in a pipe 12 an air loading pressure continually representative of rate of air flow through the vapor generator unit. The pilot valve 11 is preferably of the type disclosed and claimed in the patent to Johnson 2,054,464.

By "air flow" we intend to include the rate of flow of the gaseous products of combustion and excess air passing through the unit, i. e. the assembly of vapor generator, superheater, economizer, etc. As is well known by those familiar with the art, air flow has long been utilized as an indication of firing rate or heat liberation and thereby an indication of heat availablility for vaporizing the liquid and superheating the vapor. On the other hand, the rate of flow of steam produced under constant conditions of temperature and pressure is a measure of heat absorption. When a vapor generator of the type being described is one of several supplying a header system, the rate of steam outflow may be a preferable guide to unit operation as an indication of load or demand. On the other hand, when such a vapor generator supplies a single consumer, such as a turbine, the demand is relatively constant and variations in firing or heat absorption of the surfaces show up as variations in temperature and pressure of the produced steam. In either case, pressure is usually the index utilized to control the supply of the elements of combustion and thereby the heat liberation, so that we may assume that steam outflow pressure is maintained substantially constant. In the present embodiment, we have preferably utilized air flow as an index of firing rate and heat availability. However, we may, under certain conditions of operation, desirably utilize steam flow as a measurable variable indicative of demand or load upon the unit as a whole. Such a system is shown in Fig. 1A which otherwise is the same as Fig. 1.

We have illustrated at 13 a meter continuously responsive to the total temperature of the steam leaving the unit and arranged to vertically position the movable element of a pilot valve 14 to thereby establish in a pipe 15 an air loading pressure continuously representing the total temperature of the superheated steam leaving the unit.

Theoretically a control of the proportioning of the feed water through the conduits 6 and 7, primarily from an indication of load or demand upon the unit and with a check back from final steam temperature, would provide a satisfactory solution for the problem of maintaining a uniform final steam temperature. However, due to variables in the operation of such a unit, it is found that the problem is not quite this simple. Our present invention provides method and apparatus suitably taking into consideration the various extraneous effects which may be detrimental to operation.

The unit herein contemplated may be designed for continuous operation at a rate of 500,000 lb. per hr. with peak operation of 650,000 lb. per hr., of steam at 1200 p. s. i. g. and 1000 FTT. The convection type superheater normally has an expected characteristic of an increasing function with load. Thus, even though the convection superheating surface is designed to produce steam at 1000 FTT at rated load, the steam temperature will be excessive through that range in rating between rated and peak load, while it may be below the desired value from rated load downwardly. The unit may therefore be designed to produce steam at 1000 FTT at a rating slightly below rated load operation which means that the rating span of excessive temperature is greater than for the design first discussed. Provision is then made to preclude the possibility of over-run of the characteristic curve above desired final steam temperature by conditioning or attemperating the steam as it enters the convection superheater.

This is accomplished by a condenser type heat exchanger of the indirect type where some of the boiler feed water is passed in heat exchange relation with the superheated steam leaving the separation drum on its way to the superheating surface. This provides a control of the moisture content of the steam entering the superheater by condensing part of the steam through using a part of the boiler feed water as the cooling medium, and adds no solids to the steam. The present method, the manufacturer points out, is faster than either the gas by-pass or desuperheating methods known because it requires less surface for the same controllable range than the desuperheating method and the temperature of less metal has to be changed when the steam temperature varies. As a further advantage, pointed out for the condenser method, is that pressure loss due to the steam flowing over the condenser surface is negligible, as compared to the pressure loss through or over desuperheating surface, if the amount of desuperheating surface is not to be prohibitive. Our present invention is directed to the control of the heat exchange water passed through the condenser attemperator and specifically in proportioning the water passed to the vapor generator unit between flow through the economizer and flow through the condenser.

From the above discussion, one would naturally expect that, beginning the application of cooling water to the condenser at a preselected rating, the rate of supply of cooling water should be along an increasing characteristic substantially similar to the expected characteristic of the convection superheater, namely as an increasing function with load on the unit. It has been found, however, that the condenser type attemperator has a sensitivity and duty factor which must be taken into account. The sensitivity of the condenser is not always the same at different rates of operation. With a total flow of 650,000 lb. per hr. to the unit there will be some relationship between the proportioning valves which will be most satisfactory. At a lower flow to the unit, say 500,000 lb. per hr., this same relationship between the two valve openings might not give the best result due to thermal inertia and other operational effects upon the condenser, to say nothing of valve characteristics, feed water pump pressure, etc.

Furthermore, sensitivity and response may vary the requirements under different conditions of cleanliness and with different fuels being burned. Depending upon the dirtiness of the boiler and the type of fuel fired it may be possible to have zero condenser flow all the way up to 500,000 lb. per hr. and then start opening the condenser valve. Alternately, it might be necessary to start opening the condenser valve when the total flow to the boiler reaches the value of 200,000 or 300,000 lb. per hr. Thus the pick-up point of water supplied through the condenser, and sensitivity and duty demand of the condenser, may vary with cleanliness and length of operation of the unit as well as with the type of fuel fired and other operational variables, and a proper control system must be so adapted to the unit as to result in the production of optimum final steam temperature over a wide upper range of ratings irrespective of variables encountered in the operation of the unit.

Problems encountered in the operation and control of this type of unit may be enumerated:

1. Thermal inertia or lag of the attemperator 3 between change in the position of valve Y and resulting temperature change sensed at meter 13.

2. Change in sensitivity and duty of the condenser with dirtiness of the unit as well as type of fuel burned and other operational variables.

3. Stand-by, start-up, and similar low load operation, below the normal temperature control range, as well as in bringing the steam temperature up to desired standard without overshoot. Wide swinging loads within the controllable range of unit operation.

In general these control problems are satisfactorily solved by our invention, as:

1. The air flow (demand) or (steam flow meter 100A Fig. 1A) index is necessary, due to thermal inertia or metal lag of the unit, to anticipate the effect upon final steam temperature of rapid and material load changes. However, this primary or coarse control effect is made ineffective at loads normally below the control range. When load is sufficiently high that the convection superheater characteristic brings steam temperature into the control range, and thereabove, the air flow anticipating effect is available, but only during change in demand (air flow), the impulse wiping-out on a time basis as demand steadies out.

2. The secondary, or vernier, control effect from final steam temperature, is normally effective through a proportional relay having reset action preventing stabilization at other than standard, and accelerated in its effect upon the water control valves. Below control range the reset action is nullified and the relay effect is multiplied in accordance with rate of temperature change above a minimum value.

DEFINITIONS

Hereinafter, we use certain terms to mean:

"Control Range" for the controllable range of unit operation, i. e. operation from peak load downwardly to some steam rating below which the convection characteristic drops off so rapidly that steam temperature is expectedly uncontrollable. In this example the controllable range of unit operation may be from 650,000 lb. per hr. down to some 200,000 lb. per hr.

"Standard" or desired value of final total steam temperature, for example, 1000 FTT.

"Regulating Range," sometimes called proportional band. The range of values of the controlled variable (temperature) which corresponds to the full operating range of the final control element, for example, complete expected throttling travel of valve Y for 970–1030 F.

Referring now to Fig. 1 we will explain our control system in connection with unit operation at or near rated load (within control range) and with final steam temperature within the regulating range of desired or standard temperature.

Normal operation within control range

Whenever, the boiler load changes as indicated by a change in air flow at meter 10 (within the controllable range of the condenser 3), pilot 11 makes a proportionate change in the loading pressure in pipe 12. Pipe 12 communicates with the C chamber of a relay 16 and also, through an adjustable bleed valve 17, with its B chamber. Relay 16 may be of the type disclosed and claimed in the patent to Gorrie Re. 21,804 and has an output (D) chamber connected by a pipe 18 to a manual-automatic selector station 19 which may be of the type disclosed and claimed in the patent to Fitch 2,202,485. The proportionate change in the loading pressure is impressed, through a pipe 20, upon the valve Y, and by way of reversing relay 21, selector station 22 and pipe 23 upon valve X, calling for a change in condenser water flow. This change is effected by movement of control valves X and Y in opposite directions amounts determined by the valve positioners 24, 25 of valves X and Y respectively. The valve positioners 24, 25 may be of the type disclosed and claimed in the copending application of Harvard H. Gorrie et al. Serial No. 47,516 now Patent No. 2,679,829 dated June 1, 1954, and are provided with cam adjustability insuring that incremental changes in control pressure in pipes 20, 23 will properly position the valves regardless of variations in water pressure, flow resistance, valve characteristics, etc.

Fig. 1B illustrates, to a somewhat larger scale, the top mounting and valve positioner of valve Y. The loading pressure in pipe 20 is subjected upon the interior of a bellows 101 whose movable end acts upon a force beam 102 pivoted as at 103. The other end of beam 102 is arranged to position the movable element of a pneumatic pilot 104 thereby establishing an output fluid pressure in a pipe 105 leading to one side of a diaphragm 106 for positioning the same. The diaphragm 106 is arranged to position the main valve stem 200 and its extension 201 as well as the flow controlling parts of valve Y. Movement of the valve stem is transmitted through gears or levers to angularly position a shaped cam 107. The cam is contacted by a follower roller carried on one end of a pivoted bell-crank 108 whose other arm carries one end of a spring 109 arranged to load the beam 102. The cam 107, bell-crank 108 and loading spring 109, provide a motion follow-up from positioning of the main valve stem 200 upon change in loading pressure within pipe 20 and bellows 101. The cam may be shaped to provide a linear relation between loading pressure in pipe 20 and movement of the main valve stem; or any desired relation therebetween. Such a positioner for dictating the movement of a control valve performs the function of a relay wherein the fluid loading pressure (in pipe 20) originating at a measuring controller is amplified, or modified, if necessary to overcome friction, pressure off-balance, viscous fluid effects, valve flow characteristics, or the like, and position the valve in exact or desired proportion to changes in controller output pressure.

The loading pressure in pipe 12 is so subjected upon the relay 16 that its effect is passed on to valves X and Y only when air flow (demand) is changing. After each change, the effect of the loading pressure is gradually dissipated or wiped out during a time interval, the length of which depends upon the speed and extent of the load change that has occurred.

An increase in pressure within pipe 12 is immediately felt within the C chamber of relay 16 and results in a proportionate increase in pressure in the D chamber until relay balance is attained. However, the pressure increase in pipe 12 is at the same time gradually effective within the B chamber by virtue of the hand adjustable bleed valve 17. Thus, in time, the increased pressure will be equally effective in the B and C chambers so that the effect of the increase will cancel out. The length of time during which an air flow anticipating effect is passed to valves X and Y, i. e. the time necessary for pressures in B and C to equalize following a change in pipe 12 pressure, depends upon the magnitude and rate of the change, as well as the adjustment of bleed valve 17.

Thus, upon change in air flow rate (demand) from steady state, a call for adjustment of the water valves X and Y is immediately transmitted, proportional to the demand change, in the proper direction to anticipate the expected change in steam temperature. This initial action of the air flow responsive controller avoids the necessity for waiting, after a change in the load or the firing conditions, until these changes have actually produced a steam temperature change before changing the water flow rate. It compensates for the "thermal inertia" of the system. The change in control pressure is then wiped-out on a time basis until, when demand steadies, the air flow effect is nullified.

All of this time a shut-off valve 26, in a branch 27 of pipe 12, leading to the B chamber of relay 16, is closed off. The use of this connection will be explained later.

The effect of the loading pressure changes made in pipe 18 by the air flow responsive controller 10 is continually checked, corrected and/or replaced by changes in the loading pressure originating from the final steam temperature controller 13, in pipe 15. This acts through a standardizing relay 28 and an accelerating relay 29, upon the A chamber of relay 16, to determine the final accurate adjustment of the water flow to the condenser, to maintain the steam temperature desired.

Pressure within the pipe 15 is subjected upon the A chamber of the relay 28 which may be of the standardizing type disclosed and claimed in the Gorrie Patent Re. 21,804. The relay is provided with an adjustable bleed connection 30 interconnecting the D and C chambers so that there is a continual tendency to equalize the pressures in these two chambers. The resulting reset action prevents stabilizing out at a steam temperature other than "standard." The output loading pressure of the D chamber is introduced into the A chamber of an accelerating relay 29 which may be of the type disclosed and claimed in the patent to Fitch 2,441,405.

The relay 28 provides a proportional control with reset characteristics. It provides for the vernier control index (final steam temperature) a floating control of high sensitivity superimposed upon a positioning control of relatively low sensitivity. The function of the adjustable bleed connection 30 is to supplement the primary control of the pressure effective in the output pipe 31 with a secondary control of the same or different magnitude as a follow-up or supplemental action. The sensitivity of the controller 13 may be adjusted to provide a proportional band of say 30 F. each side of standard (1000 FTT) so that, were the relay 28 functioning as a simple proportional response type, the output pressure in pipe 31 would be varied between the limits 5–25 p. s. i. for temperature migrations of 970–1030 F. However, such a system might tend to stabilize out at temperatures above or below the desired standard. The reset action provided in the relay tends always to return steam temperature to the desired standard with a minimum of over-travel or hunting.

In normal operation then, within the controllable range of loads upon the unit, and with steam temperature within the selected regulating range across the standard temperature, departure of temperature from standard varies the loading pressure in pipe 15 and, acting through the standardizing relay 28 and accelerating relay 29, is effective in the A chamber of relay 16 to algebraically combine its effect with any pressure effect from air flow in relay 16, and act to position water valves X and Y.

All of this time the valve 32 at the entrance to the C chamber of relay 28 is closed.

*Operation outside of control range*

The unit of the present example is assumed to have a rated capacity of 500,000 lb. per hr. and 650,000 lb. per hr. peak operation, at 1200 p. s. i. g. and 1000 FTT. The controllable range of operation may be, for example, from 200,000 to 650,000 lb. per hr. Below 200,000 the convection superheater characteristic curve may preclude any possibility of maintaining steam temperature controllably near the desired standard and final steam temperature may fall off rapidly with rating. Problems attendent stand-by, start-up or similar low load operation below the controllable range, or on widely swinging loads which may carry the steam temperature temporarily outside the selected regulating range, have produced additional features in the system of Fig. 1, of our invention, and which will now be described.

With a proportional type relay (28) having reset characteristics it is known that as the temperature returns to the control-point or standard, the regulating range shifts. It is this shifting of the range which restores the temperature to standard after a load change. Therefore, by the addition of automatic reset, the standard is maintained under normal load conditions, but start-up characteristics may become poor. This possibility, with a relay such as 28, is known as bleeding-out-of-range.

The spring loading of relay 28 is normally about 15 p. s. i. (midway of 5–25 regulating range). When the temperature is at standard, the pressure in A chamber balances the spring loading and the supply-exhaust valves of the D chamber are in a neutral position, holding a constant pressure (any value within the range 5–25 p. s. i.) in the D and C chambers. Since the temperature is at standard a steady state prevails, but the pressure in D may, or may not, be the same as in A. If temperature departs from standard the controller will transmit a new proportional pressure to A chamber, and the balance between A pressure and spring loading will be upset. When the system again balances out the pressure in D chamber may be at an entirely new value.

If temperature changes remain within the regulating range (control pressure in D at neither extreme of 5 or 25 p. s. i.) the return of temperature to standard will be accomplished without appreciable over-shoot or hunting. However, under abnormal operating conditions the D chamber pressure may bleed-out-of-range, i. e. beyond the extremes of 5–25 p. s. i. That is, the system may try to more fully open or more fully close the water valves X and Y after they are already wide open or tightly closed.

In such case no change in control pressure and no effective movement of the water valves will result from approach of steam temperature toward standard until it has actually arrived there, and the steam temperature arrives at standard value with the water valves at one extreme or the other. The result may be a severe overshoot before the system steadies out.

By way of example, assume that the unit has been on stand-by (below 200,000 lb. per hr.) or perhaps, maintaining pressure without vapor outflow. Vapor outflow begins at saturation temperature and, due to the characteristics of the convection superheater, there must be a substantial rating attained before final steam temperature approaches the regulating range (970–1030 F.) All of this time the control pressure in pipe 31 has been out-of-range. As previously pointed out, the steam temperature may considerably over-shoot before the system settles out. Wide and sudden swings of rating during otherwise normal operation within the controllable range may result in the same over-shooting.

A preferred way of obviating this over-shooting is to remove the standardizing or reset action from the relay 28 upon start-up or during any operation outside of the controllable range of operation or at any time when steam temperature is without the selected regulating range of values. This we do by the valve 32, operable from the temperature controller 13.

The bellows operator of the valve 32 is loaded by pressure in the pipe 15, output of the controller 13. The loading is such that above a steam temperature of 970° F., for example, the valve 32 is closed and no pressure effect is admitted to the C chamber of relay 28 by way of pipe 35. Thus, with valve 32 closed, relay 28 functions as a standardizing relay with reset characteristics, as previously explained. When steam temperature is below 970° F., as on start-up or wide range swings, the valve 32 is open and pipe 35 subjects upon the C chamber of relay 28 the output pressure of the D chamber of a multiplying relay 36.

Pipe 15 connects directly to the A chamber of relay 36 and to the B chamber by way of a hand adjustable bleed valve 37. Thus the output of relay 36, available in pipe 35, is varied only upon change in steam temperature; any change in A chamber loading being slowly wiped out as the pressure change bleeds through valve 37 to equalize the A and B chamber pressures.

It will be seen that, with valve 32 open, the action of relay 28 is doubled, or multiplied by some amount less than twice its A chamber pressure, i. e. the A and C chambers act in the same direction. Therefore, during start up or under widely swinging loads, the reset action of relay 28 is replaced by an effect which is a multiple of its A chamber loading.

When below, but approaching control range, condenser water flow anticipation is desirable, particularly if temperature is rising rapidly, in order to prevent over-shooting the desired temperature. Therefore, below the control range, valve 32 is open, connecting pipe 35 to the C chamber of relay 28. This changes the standardizing action of the relay 28 into a multiplying action from the temperature controller 13. The extent to which impulses from controller 13 are increased depends upon the speed and extent of steam temperature change, due to the adjustable bleed valve 37 which dissipates the effect of this relay at a rate proportional to the initial change. In addition, the spring loading on relay 36 is such as to produce an output of approximately 7 p. s. i. when the relay is in equilibrium. Thus, even when the A and B chambers of relay 36 are in equilibrium, there is an effective pressure of 7 p. s. i. (slightly less than one-half of the 5–25 p. s. i. possibility) always effective upon the C chamber of relay 28 when the valve 32 is open.

As the boiler load rises, the doubling or multiplying action of these relays calls for a condenser flow even before the desired steam temperature is attained. A rapid temperature rise calls for more condenser flow than an equal slow rise. When the temperature rises to 970° F. (or some other selected limit below the "standard" value), the bellows 32 closes, restoring relay 28 to its normal standardizing and reset action.

The question will arise as to why pipe 15 pressure is not admitted directly to pipe 35 and relay 36 omitted. This would convert relay 28 into a true doubling relay.

The trouble with applying the pipe 15 loading pressure directly into the C chamber of relay 28, rather than going through the relay 36 is that it could, acting as a straight positioning control, level the temperature off at some value below standard and hold it there. It is also desirable to have a means of returning the condenser valve Y to a closed position if the temperature did stop increasing somewhere below the tripping point of the shut-off valve 32. By using the relay 36 the instantaneous changes of the pipe 15 pressure upon increasing temperature are transmitted through to the C chamber of the standardizing relay 28 and then this impulse is wiped out by bleeding the pipe 15 pressure slowly into the B chamber of the relay 36. The faster the steam temperature increases, coming up to the point at which the shut-off valve 32 trips, the further open it carries the condenser inlet valve, since the wipe-out effect of relay 36 would have little time to make itself felt. If the temperature increased at a slower rate than the rate of wipe-out in the relay 36, it would just put the standardizing relay 28 back in action with 5 p. s. i. loading out of its D chamber, which would be the correct thing to do, since the slowly increasing temperature can be handled satisfactorily by the regular control action without any anticipating help or doubling or multiplying action. This is because it would not have to wait for the standardizing relay 28 to build up from say 0 to 5 p. s. i. that had previously bled out of range.

While loading the C chamber of the relay 28 prevents it from bleeding out of range; the use of the relay 36 is primarily additionally for the purpose of getting the condenser valve open before the temperature reaches standard after operating below the standard for an appreciable period of time. The relay 36, or the doubling action on the standardizing relay 28, is found to be better than merely nullifying the standardizing or reset action. With the invention of Fig. 1 we attain the doubling or multiplying effect well up into the range of operation and go back into the reset action when the temperature has almost reached standard. There is an advantage to this because on a load pick-up there is a certain amount of over-firing of the unit to maintain steam pressure and to initiate super-heating of the saturated steam, and this doubling or multiplying action of the relay 28 actually produces an over-control action to somewhat offset the effect of the over-firing.

GENERAL

During normal operation, within the controllable range of the unit, and with final steam temperature within the selected regulating range, an anticipating effect is available from changes in demand (air flow) slowly wiped out on a time basis as demand steadies. Variations in steam temperature from standard act through a standardizing relay having reset characteristics; and through an accelerating relay, upon an averaging relay where the effect is algebraically added to the air flow effect and the resultant positions the valves X and Y.

Under start-up or widely swinging load operation, with steam temperature below the lower limit of the regulating range, demand (air flow) does not enter the picture. This is true because valve 26 is open when steam temperature is outside the regulating range, for example below 970° F. Opening of valve 26 imposes the loading pressure of pipe 12 upon the B chamber of relay 16 thus making the B and C pressures equal and cancelling. The variations in steam temperature are magnified by a multiplier determined by rate of temperature change to control the valves X and Y.

The result is a control which may be left on automatic not only under normal operating conditions, but through start-up, stand-by and other conditions of operation not normally handled by known control systems.

In connection with Fig. 1 we have spoken of positioning the valves X and Y, through the agency of reversing relay 21, to move the valves relatively in opposite directions for proportioning the water between the economizer and the condenser. Under certain conditions of design and operation it may be desirable to open both valves X and Y at the same time but possibly at different rates.

*Operation 1*

Under the arrangement of Fig. 1, where valve Y may be opening while valve X is closing, it will be understood that the total supply of feed water to the unit is controlled in normal manner either by control of the feed pump or of a master supply control valve in the pipe 5 ahead of the proportioning valves X, Y. With the total flow under such regulation, the valves X, Y proportion the total through the economizer and condenser, over the fixed low value continually admitted to the economizer through the valve 9 to prevent any possibility of steaming.

This fixed value may, for example, be at a rate of 10,000 lb. per hr. for the unit under consideration.

As one example of operation in accordance with Fig. 1, the total water supply through the pipe 5 may increase substantially linearly with rating from 0 to 500,000 lb. per hr. rate. The condenser valve Y may be closed and not start to open until an output rate of some 200,000 lb. per hr. The economizer valve X may be wide open until some rating of say 300,000 lb. per hr. After the condenser valve Y and the economizer valve X each begin to move they may move at different rates, the one from the other, and in opposite direction, the valve Y opening while the valve X pinches down so that water is diverted from the economizer through the condenser.

It will be appreciated that limit stops, air loading, spring loading, adjustment of the valve positioners 24, 25, etc. provide for the pick-up point of the two valves as well as the slope of their opening and/or closing relative to each other.

Operation 2

Under certain design conditions of pipe sizing, valve sizing with reference to economizer and condenser pressure drops, as well as pressure drop conditions and characteristics of the main control valves and/or feed pumps, it may be desirable to take a part of the total pressure drop through the valves X and Y and have them both open at the same time but possibly at different rates. For example it may be desirable to have the condenser valve closed up to say 300,000 lb. per hr. rating and to have the economizer valve X say one-half closed up to some 350,000 lb. per hr. rating. At the indicated ratings the valves would begin to open and open at predesigned rates which may be different the one from the other. Presumably under this operation the economizer valve would open at a faster rate than the condenser valve.

It will be appreciated that either type of operation may be accomplished by the adjustment of the various pieces of apparatus diagrammatically indicated in Fig. 1.

Referring now particularly to Fig. 2 we indicate thereon additional operational and control features over that just described in connection with Fig. 1. Similar parts bear the same reference numerals.

In Fig. 2 an additional operational index is utilized in the control, namely the measured rate of flow of water supplied through the pipe 7 to the condenser. Water flow meter 40 is connected to be sensitive to the pressure differential existing across an orifice 41 located in the pipe 7 and positions the movable element of a pilot 42 to provide in a pipe 43 a pneumatic loading pressure continuously representative of rate of flow of water to the condenser 3. This provides a measured water flow checkback against the water supply demand originated (as previously described in connection with Figs. 1 and 1A) by the air flow, steam flow, or demand index and the final steam temperature index.

In order to obtain adjustment flexibility, characterizers 44 and 45 are included in the loading pressure lines 43 and 12 respectively from the water flow and air flow responsive controllers 40 and 10. By means of these, the effective loading pressures from the controllers may be given desired linear or non-linear characteristics to suit the characteristics of the equipment under control. Such characterizers may be of the type disclosed and claimed in the patent to George E. Luppold, Jr. No. 2,777,457. Characterizers permit the relative sensitivity depending upon load for the air flow anticipation and since we may not have uniform efficiency on the condenser flow, it is desirable there also. In other words, assuming a certain maximum duty and corresponding condensing water flow, if the duty is half as much we are not sure if the water flow should be half as much because the efficiency of the condenser may not be uniform at all loads. The condenser duty is related to boiler load and excess air and is therefore normally related to air or gas flow through the boiler. However, the relationship varies with the type of fuel and also with boiler cleanliness. For that reason the air flow element is used for anticipation only and its effect felt only on a change in air, neutralizing out when air flow steadies. In order to give proper sensitivity regardless of rating, the air loading produced by air flow measurement is characterized and equipped with a cam making possible small increment loading changes on given air flow changes at low loads and larger loading changes for equal air flow changes at high loads.

Fig. 2A illustrates the characterizer 45 to a larger scale. The loading pressure of pipe 12 is effective within a bellows 110 which exerts a force upon beam 111. Beam 111 positions the movable element of a pneumatic pilot valve 112 establishing an output control pressure in pipe 27. Opposing the force of bellows 110, upon beam 111, is a spring 113 loaded by a bell-crank 114. The bell-crank is positioned by a cam 115, in turn positioned by a diaphragm 116 through the agency of a member 202—203, in response to pressure in pipe 27.

Thus, the characterizer 45 is inserted between the loading pressure of pipe 12 and the output pressure of pipe 27, to characterize or change the pressure signal in accordance with the shape of the cam 115. If the cam is a linear rise type then pressure in 27 is directly proportional to pressure in pipe 12. Preferably, the cam is shaped when the system is calibrated or tuned-up and may take into account operational characteristics of the fans and other plant equipment.

By tying condenser water flow into the picture it is not essential to have definite port shapes in the control valves and these valves will necessarily position themselves to produce the required condenser flow as called for by the condenser duty indicated by air loading from the relay.

The arrangement of Fig. 2 follows the "Operation 2" previously discussed with the possibility of the valves X and Y opening in parallel but perhaps at different rates. It will be seen that the reversing relay 21 of Fig. 1 has been omitted in Fig. 2 so that the air loading pressure in the pipes 20, 23 act in the same direction upon the valves X and Y.

In the arrangement of Fig. 1 we have shown only the steam temperature impulse accelerated because, due to the fly wheel action of the mass of metal in the superheater, we should have an appreciable amount of overshoot on condenser flow and then remove the overshoot on a time basis. If we wait for the steam temperature change alone to remove this over-shoot, we have waited too long and will have an unstable control. For this reason accelerating relay 29 is effective only on the steam temperature impulse. It is of course quite possible that, under some conditions of design or operation, we would wish to accelerate both the steam temperature and air flow (demand) impulses, or the resultant of all of the impulses, or we might wish to accelerate the steam temperature at one rate and the air flow at another rate. By way of example, we show in Fig. 2 that the acceleration is of the steam temperature and air flow, while in Fig. 3 we show the resultant of the steam temperature and the drum level accelerated.

The bellows operated shut-off valves 32, 26 of Fig. 1 are replaced in Fig. 2 by solenoid actuated valves 32A and 26A, electrically actuated from the steam temperature controller 13. Contacts 46 are provided in the controller 13, one set for operation of solenoid valve 32A and the other set for operation of solenoid valve 26A. Adjustment of these contacts allows the possibility of opening or closing valves 26A and 32A at different values of steam temperature and with an adjustable amount of overlap or gap between the steam temperature value of opening or closing each of the valves. This precludes any possibility of hunting back and forth across a particular temperature value at which the shut-off valves might open or close if the same value were used for opening as for closing. In other words, in coming up on steam temperature valves 26A, 32A may close at a temperature of say 970° F. while the valves may not open until the steam temperature has fallen to a value of 965° F.

In the wiring 47, from the contacts 46 to the valve 26A, we provide a disconnect switch 48 which may be hand actuated at times of blowing soot from the heat exchange surfaces of the unit. This provides a possibility of shorting in parallel with the proper contact 46 to open the valve 26A and remove air flow impulse from the system during time of air flow disturbance by soot blowing. During such soot blowing period the system will remain on automatic but operates from steam temperature impulse and water flow meter impulse only. Without this possibility the wide disturbing influence of blowing soot, upon air flow rate through the unit, might seriously disturb the control system presently being described.

Fig. 2B is a more detailed diagram of the electric wiring of Figs. 2 and 3. The solenoid actuated valves 26A and 32A are shown in very diagrammatic manner, each having an opening and a closing winding. Within the measuring controller 13 a member 120 is positioned longitudinally in accordance with steam temperature value. Carried by the member 120 are two contact actuators 121, 122, separately adjustable along the member to desired temperature values, and arranged to energize the proper circuits for opening, or closing, valve 26A and/or valve 32A at predetermined temperature values.

In general the arrangement of Fig. 2 provides, during normal operation, that the relay 16 passes to the pipe 18 an air loading pressure resulting from the steam temperature controller 13. This output pressure in the pipe 18 is subjected upon the A chamber of a differential standardizing relay 50, to the B chamber of which is subjected the loading pressure from the pipe 51 output of the water flow controller 40. The output of the differential standardizing relay 50, available in the pipe 52, joins the manual-automatic selector station 19 and the control pipes 20, 23. Positioned in the pipe 23 is a similar manual-automatic selector station 22 so that the stations 19, 22 allow the possibility of hand positioning of the valves X and Y.

The arrangement of Fig. 3 is directed to a unit of somewhat larger size and different arrangement. For example, this system is arranged to control final steam temperature on a unit having normal operating capacity of 1,200,000 lb. per hr. with peak capacity of 1,450,000 lb. per hr., at 1850 p. s. i. g. and 1000 FTT, with a reheat section producing steam at a final temperature of 1000 FTT. It is expected that the controllable range of final steam temperature is 500,000 to 1,450,000 lb. per hr. operation. The particular arrangement of Fig. 3 is in connection with control of the temperature of steam heated through serially connected primary and secondary superheaters with the condenser attemperator 3 located therebetween. The reheat surface is subjected to heated gases proportioned thereover by a control of series and by-pass dampers conjointly from an index of demand (air flow) and final reheat steam temperature. Such control is not new and is therefore not included in the present Fig. 3.

In this arrangement the control is primarily a three-element control with the primary control from the air flow index giving anticipating effects as previously outlined. The temperature of the steam leaving the final or secondary superheater, as well as the measured rate of flow of water to the condenser, are used as secondary controllers. However, a fourth element, drum level, is incorporated in this control system to prevent flooding of the boiler drum in the event that a condition should exist where the boiler feed water control valves were completely closed. This would result in flooding the boiler drum because condenser water flow is taken off of the main feed water header ahead of the feed water control valve.

Steam from the drum 1 passes serially through a primary superheater 4, an attemperator 3, and a secondary superheater 60. Final steam temperature at the outlet of the secondary superheater 60, namely at location 61, is the activating index for a controller 13. Total feed water supplied to the boiler drum enters the unit through the conduit 5 and is regulated in well known manner from a three-element control utilizing the indexes total steam outflow rate across an orifice 62, total water inflow rate across an orifice 63, and level in the drum 1, to conjointly be effective in positioning the total regulating valve 64 at the entrance to the economizer 8. It will be seen that, while the three-element regulating system is responsive to total water supply rate, the valve 64 does not include a regulation of the water passing through the pipe 7 and attemperator 3 which is diverted from the pipe 5 between the orifice 63 and the regulating valve 64. To preclude any possibility of a tight closed valve 64 starving the economizer 8, it may be desirable to return the condenser water through a pipe 65 to the entrance of the economizer 8. Thus, there will at all times be a minimum of say 5000 or 10,000 lb. per hr. water passing through the economizer to prevent it from burning out even though valve 64 is tight closed.

Level within the drum 1 is used as an element in the control system of Fig. 3 to check-back on actual drum level and prevent flooding the drum in the event of a condition which might exist where the valve 64 is completely closed and still the control system called for a supply of water through the valve Y, conduit 7, attemperator 3, pipe 65 and economizer 8. Thus a final check-back on the level of water within the drum 1, sensed by a meter 67, positions the movable element of a pilot 68 to provide a fluid loading pressure in the pipe 69 continuously representative of drum level. The adjustability and sensitivity of the controller 67 is such that the effect of the loading pressure within the pipe 69 acts in the B chamber of differential standardizing relay 28A only if dangerous drum level is approached. Otherwise the system of Fig. 3 is similar to that previously described in connection with Fig. 2 except that the total control is by the valve Y.

While we have chosen to illustrate and describe certain preferred embodiments of our invention, it will be understood that this is by way of example only and not to be considered as limiting.

What we claim as new, and desire to secure by Letters Patent of the United States, is:

1. The method of controlling the final temperature of superheated vapor leaving a vapor generating unit, which includes, passing the vapor under pressure serially from a separation drum through an indirect contact heat exchanger and a superheater, supplying one portion of liquid to the heat exchanger for heat exchange with the vapor passing therethrough and hence to the separation drum, supplying the remaining portion of feed liquid directly to the separation drum, measuring the temperature of the vapor leaving the superheater, obtaining an index of demand for superheated vapor upon the unit, during normal operation of the unit within the controllable range of demand and with vapor temperature within a selected regulating range jointly utilizing the measurement and the demand index to control the proportioning of liquid feed as between the portion which first passes through the heat exchanger and that portion which goes directly to the drum, and during subnormal operation below the controllable range or below the selected regulating range utilizing only the measurement of vapor temperature but on a magnified basis to effect the proportioning.

2. The method of claim 1 wherein the proportioning of liquid feed between the two paths is inversely accomplished, i. e. as the flow through one path is increased that through the other is decreased.

3. The method of claim 1 wherein the proportioning of liquid feed between the two paths is accomplished by simultaneously opening (or closing) both paths but at different preselected rates.

4. The method of claim 1 wherein during normal operation the regulating effect from the demand index is utilized only during change in demand and is wiped out as demand steadies.

5. The method of claim 1 wherein the demand index is a measurement of the rate of flow of the heating gases contacting at least a portion of the heat exchange surfaces of the unit.

6. The method of claim 1 wherein the demand index is a measurement of the rate of flow of vapor passing through the superheater.

7. The method of claim 1 wherein the regulating effect during subnormal operation from final steam temperature is multiplied during change in temperature by a factor determined by rate of change of temperature.

8. The method of claim 1 including the step of utilizing a third control index namely rate of liquid supply through the heat exchanger as a check-back in the proportioning of the total liquid supply rate (during all rates of operation).

9. The method of claim 8 including the step of utilizing a fourth control index namely separation drum liquid level in the control of admission of liquid to the drum by way of the heat exchanger.

10. In the control of final vapor temperature produced by a vapor superheater the method which includes, during operation within a preselected controllable upper range of rating operation producing a control effect upon and in accordance with departure of temperature from an optimum value; and when operating below the preselected controllable upper range of rating and below a preselected regulating range of temperatures magnifying the action of variations in temperature by a multiplier related to rate of change in temperature in producing the control effect; and utilizing the control effect in maintaining a selected superheated vapor final temperature.

11. The method of controlling the final temperature of superheated vapor leaving a vapor generating unit, which includes, passing the vapor under pressure serially from a liquid-vapor separation drum through an attemperator and a superheater, measuring the temperature of the vapor leaving the superheater, obtaining an index of demand for superheated vapor upon the unit, during normal operation of the unit within a preselected controllable upper range of ratings and with vapor temperature within a selected regulating range jointly utilizing the measurement and the demand index to regulate attemperation of the vapor, and under operation below the controllable range or below the selected regulating range utilizing only the measurement on a magnified basis to regulate the attemperation.

12. In combination with a vapor generating unit having a liquid-vapor separation drum, an indirect contact heat exchanger, and a vapor superheater joined for serial flow of the vapor therethrough from the liquid-vapor separation drum to the point of final discharge from the said superheater; liquid supply means arranged to supply vaporizable liquid under elevated pressure to the unit, control means including a pair of flow valves, one of the valves being in the path of flow of liquid to the vapor generator portion of the unit direct and the other of the valves being in the path of flow of liquid to the vapor generating portion of the unit by way of the heat exchanger, a meter determining an index of load upon the unit, a meter determining the final temperature of the vapor leaving the superheater, means opertaively connecting said meters to conjointly position the said valves to proportion the two flows of liquid, and means actuated by the temperature meter to make ineffective the load index meter when a selected regulating range of final superheated vapor temperature is below a selected regulating range spanning the desired final temperature.

13. The combination of claim 12 wherein the index of load is a measure of the heating gases for the vapor generator.

14. The combination of claim 12 including means wherein the valves are inversely controlled, i. e. as one opens the other closes.

15. The combination of claim 12 including means wherein the valves are opened (or closed) together but each at its own preselected rate.

16. The combination of claim 12 including second means actuated by the temperature meter when temperature is below a predetermined value effective to magnify the effect of the temperature meter in the proportioning control during change in temperature and by a multiplier determined by the rate of change in temperature.

17. The combination of claim 16 including means to wipe out the multiplying effect upon a time basis as temperature steadies.

18. In combination with a vapor generating unit having an indirect contact heat exchanger and a superheater joined for serial flow of the vapor therethrough from a liquid-vapor separation zone to the point of final discharge from the unit, means for passing heating gases over the superheater, liquid supply means arranged to supply vaporizable liquid under elevated pressure to the unit through two paths one of which reaches the vaporizing portion of the unit by way of the heat exchanger, a control valve in the said one path, a first meter determining an index of load upon the unit, a second meter determining rate of flow of liquid passed through the heat exchanger, a third meter of the final vapor temperature, a fourth meter determining level of liquid within the separation zone, and control means conjointly responsive to said meters and adapted to so position the valve as to regulate the rate of liquid supply through the one path in direction to return final vapor temperature toward a predetermined value upon departure therefrom, said control means being so responsive to said fourth meter as to regulate the positioning of the valve in direction to prevent departure of the separation zone liquid level from preselected level.

19. The combination of claim 18, wherein each of the meters is arranged to provide a control effect continuously representative of the value being metered, and said control means including coordinating relays of the various effects for imposition of a result upon the valve positioning mechanism.

20. Apparatus for controlling the operation of a vapor generating and superheating unit within a preselected range of total rating operation of the unit including in combination, means regulating the final temperature of the superheated vapor in sense or direction tending to return the temperature toward an optimum value upon a departure therefrom, first means establishing a control signal or effect continuously representative of demand upon the unit, second means receiving said control signal or effect and arranged to select between steady state demand and change in demand rate, said second means establishing a resultant or output control signal or effect at time of change only in demand within the preselected range of ratings, delayed action means for the said second means gradually applying said control signal or effect in opposing relation to the resultant or output control signal or effect to nullify or wipe out the said resultant or output control signal or effect when demand steadies, and means subjecting the said resultant or output control signal or effect upon said regulating means for positioning the same.

21. The combination of claim 20 including measuring means for establishing a control signal or effect continuously representative of the superheated vapor final temperature arranged to impress said control signal or effect on the second means to assist in actuating the regulating means throughout said preselected range of ratings and, wherein the measuring means is arranged to solely actuate the regulating means through ratings outside said preselected range.

22. Apparatus for controlling the operation of a vapor superheating unit within a preselected range of total rating operation of the unit including in combination, means regulating the final temperature of the superheated vapor in sense or direction tending to return the temperature toward an optimum value upon a departure therefrom, demand responsive means immediately effective upon change in demand within the preselected range of ratings and adapted to actuate the regulating means, delayed action means for the demand responsive means gradually making such means ineffective when demand steadies, measuring means for the superheated vapor final temperature arranged to assist in actuating the regulating means throughout said preselected range of ratings, the measuring means being arranged to solely actuate the regulating means through ratings outside said preselected range, and multiplying means for the effect of said measuring means in actuating the regulating means when the measuring means is solely actuating the regulating means.

23. The method of controlling the final temperature of superheated vapor leaving a vapor generating and superheating unit, which includes, passing vapor under pressure serially from a liquid-vapor separation drum through a first superheater contacted by heating gases then through a heat exchanger of the indirect type and finally through a second superheater contacted by heating gases, supplying heated liquid under elevated pressure to the unit for producing vapor to to be superheated, passing a proportionate flow of the liquid through the heat exchanger on its way to the vaporizing portion of the unit, measuring the final temperature of the superheated vapor, obtaining a measurement of the index of demand for superheated vapor upon the unit, measuring the rate of flow of liquid passed through the heat exchanger, separately establishing a control signal or effect for the measurements of final temperature of the superheated vapor and the rate of flow of the liquid passed through the heat exchanger continuously representative of the value, conjointly utilizing the control signal or effect representative of each of the measurements of final temperature of the superheated vapor and of the rate of flow of liquid through the heat exchanger in controlling the rate of liquid flow through the heat exchanger during all rates of unit operation, establishing a control signal or effect continuously representative of the index of demand, and modifying the control of the rate of liquid flow through the heat exchanger in accordance with the demand control signal or effect when demand is changing and through a preselected controllable upper range of unit ratings or above a preselected vapor temperature by gradually applying said demand control signal or effect in opposing relation to the demand control signal or effect utilized to modify the control of the rate of liquid flow through the heat exchanger so as to nullify or wipe out the demand control signal or effect.

24. The method of claim 23 wherein the index of demand is a measurement of the rate of flow of the heating gases contacting at least a part of the heat exchange surfaces of the unit.

References Cited in the file of this patent
UNITED STATES PATENTS

| | | |
|---|---|---|
| 2,255,612 | Dickey | Sept. 9, 1941 |
| 2,319,223 | Frisch | May 18, 1943 |
| 2,416,261 | Kemper | Feb. 18, 1947 |
| 2,526,843 | Birchler et al. | Oct. 24, 1950 |
| 2,526,898 | Powell et al. | Oct. 24, 1950 |
| 2,575,885 | Mittendorf | Nov. 20, 1951 |
| 2,580,345 | Dickey | Dec. 25, 1951 |